United States Patent
Kumagai

(10) Patent No.: US 6,406,370 B1
(45) Date of Patent: *Jun. 18, 2002

(54) METHOD FOR CONTROLLING CHARACTER BEHAVIOR IN VIDEO GAMES, VIDEO GAME MACHINE, AND COMPUTER-READABLE RECORDING MEDIUM ON WHICH VIDEO GAME PROGRAM IS RECORDED

(75) Inventor: Hitoshi Kumagai, Sapporo (JP)

(73) Assignee: Konami Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,055

(22) Filed: Oct. 4, 1999

(30) Foreign Application Priority Data

Oct. 6, 1998 (JP) .......................................... 10-284513

(51) Int. Cl.$^7$ ................................................ A63F 13/00
(52) U.S. Cl. ............................................ 463/31; 463/1
(58) Field of Search ............................ 463/1, 9, 43, 30, 463/31; 273/148 B

(56) References Cited

U.S. PATENT DOCUMENTS 5,498,003 A 3/1996 Gechter

FOREIGN PATENT DOCUMENTS

| EP | 0768105 | 4/1997 |
| EP | 0844010 | 5/1998 |
| EP | 0844580 | 5/1998 |
| EP | 0860789 | 8/1998 |
| EP | 0871137 | 10/1998 |
| EP | 0899675 | 3/1999 |
| JP | 10-069213 | 3/1998 |
| JP | 10-235019 | 9/1998 |

OTHER PUBLICATIONS

"Princess Maker: How to Raise My Daughter," Youichi Yoshida, published by Kabushiki Kaisha Keibun Sha, Japan, Jan. 10, 1996.*

"Little Computer People," Rich Gold, published by Activision, Inc. 1986.*

"Petz World, Dogz II," [online]. Released 1997 [retrieved on Aug. 22, 2000]. Retrieved from the Internet: <URL: wysiwyg://256/http://www.geocities.com/..edForest/Glade/7767/petzworld2/dogz.htm>.*

"Multimedia Cats & Dogs". Inroads Interactive. Apr. 1995. [retrieved on Aug. 31, 2000]. Retrieved from the Internet: <URL:http//www.edaccess.com/html/shared/cats.htm, http://thereviewzone.com/multimediacats>.*

"Petz" [retrieved on Aug. 22, 2000]. Retrieved from the Internet: <URL: wysiwyg://17/http://www.petz.com>.*

(List continued on next page.)

Primary Examiner—Valencia Martin-Wallace
Assistant Examiner—Julie Brochetti
(74) Attorney, Agent, or Firm—Jordon and Hamburg LLP

(57) ABSTRACT

A highly entertaining video game machine that allows a character to appear in a game space is provided. The video game machine includes a storage medium for storing a plurality of preset behavior patterns. A behavior-pattern selection unit selects one of the behavior patterns according to various situations, such as the temperament and emotion of the character. A character-behavior control unit causes the character to behave according to the selected behavior pattern. The temperament setting of the character is changed by a temperament setting unit. The emotion setting of the character is changed by an emotion setting unit.

21 Claims, 11 Drawing Sheets

OTHER PUBLICATIONS

"Petz II" Ultimate Gaming Resource Game Reviews. Nov. 15, 1997. [retrieved on Aug. 22, 2000]. Retrieved from the Internet: URL:<http://www.ugr.net/reviews/pc/petz2.htm>.*

Kennedy, Kristen. "Catz, Creatures among publishers' pet projects." Computer Retail Week; Manhasset, CMP Publications, Inc. Dec. 16, 1996.*

"Dogz & Catz". GamesDomain Review. [retrieved on Aug. 22, 2000]. Retrieved from the Internet: URL<wysiwyg://64/ http://www.gamedomain.com/gdreview/zones/reviews/pc/ sep96/dogz.html>.*

"Princess Maker: How to Raise My Daughter", Youichi Yoshida, published by Kabushiki Kaisha Keibun Sha, Japan, Jan. 10, 1996.

* cited by examiner

FIG. 6

| TYPE OF TEMPERAMENT | CHARACTERISTICS |
|---|---|
| A | ALWAYS TIMID AND NERVOUS, WITH TAIL DOWN |
| B | TIMID AND ESCAPING FROM PEOPLE AND SOUND, WITH TAIL DOWN |
| C | TIMID AND HOWLING WHEN LONELY |
| D | MOVING ACTIVELY INSIDE THE HOUSE BUT BECOMING WEAK OUTSIDE THE HOUSE |
| E | QUIET |
| F | SHOWING FRIENDLY ATTITUDE TO PEOPLE AND OTHER DOGS |
| G | FRISKY |
| H | BULLHEADED AND DISOBEDIENT TO ORDERS |
| I | BARKING AT MOVING THINGS |
| J | BITING MOVING THINGS |

FIG. 7

| PARAMETER NAME | INCRESE AND DECREASE NUMERICAL VALUE | CONDITIONS FOR INCREASING AND DECREASING NUMERICAL VALUE |
|---|---|---|
| a | PLUS | INCREASES BY EVENTS OR ORDERS THAT THE DOG DOES NOT LIKE |
| a | MINUS | DECREASES BY EVENTS OR ORDERS THAT THE DOG LIKES |
| b | PLUS | INCREASES WHEN THE DOG LOOKS DECENT OR GOES OUTSIDE |
| b | MINUS | DECREASES WHEN THE DOG LOOKS DIRTY OR IS SOAKED BY RAIN FOR A LONG TIME |
| c | PLUS | INCREASES WHEN GAME PLAYER TRAINS THE DOG PROPERLY |
| c | MINUS | DECREASES WHEN GAME PLAYER SPOILS THE DOG |
| d | PLUS | INCREASES WHEN THE DOG GOES OUTSIDE AND INTERACTS WITH PEOPLE |
| d | MINUS | DECREASES WHEN THE DOG DOES NOT SEE ANYONE OTHER THAN THE GAME PLAYER FOR A CERTAIN PERIOD |

FIG. 8A (PRAISE)

| TEMPER-AMENT \ BASIC PARAMETER | a | b | c |
|---|---|---|---|
| A | (-2) | (±0) | (+1) |
| B | (-1) | (±0) | ... |
| C | ... | ... | ... |
| D | ... | ... | ... |
| E | ... | ... | ... |
|  |  |  |  |

FIG. 8B (STROKE)

| TEMPER-AMENT \ BASIC PARAMETER | a | b | c |
|---|---|---|---|
| A | (+2) | (±0) | (+2) |
| B | (-2) | (±0) | ... |
| C | ... | ... | ... |
| D | ... | ... | ... |
| E | ... | ... | ... |
|  |  |  |  |

FIG. 10

| EMOTION | CONDITION |
|---|---|
| JOY | INCREASES BY GIVING ORDERS WHICH DELIGHT THE DOG |
| ANGER | INCREASES BY GIVING ORDERS WHICH MAKE THE DOG ANGRY |
| SADNESS | INCREASES BY GIVING ORDERS WHICH MAKE THE DOG SAD |
| HAPPINESS | INCREASES BY GIVING ORDERS TO WHICH THE DOG DOES NOT RESPOND |

FIG. 11A (PRAISE)

| TEMPER-AMENT \ EMOTION | JOY | ANGER | SAD-NESS | HAPPI-NESS |
|---|---|---|---|---|
| A | ● | | | |
| B | ● | | | |
| C | | | | ● |
| D | | | | ● |
| E | | | | ● |

FIG. 11B (STROKE)

| TEMPER-AMENT \ EMOTION | JOY | ANGER | SAD-NESS | HAPPI-NESS |
|---|---|---|---|---|
| A | | ● | | |
| B | ● | | | |
| C | ● | | | |
| D | ● | | | |
| E | ● | | | |

METHOD FOR CONTROLLING CHARACTER BEHAVIOR IN VIDEO GAMES, VIDEO GAME MACHINE, AND COMPUTER-READABLE RECORDING MEDIUM ON WHICH VIDEO GAME PROGRAM IS RECORDED

BACKGROUND OF THE INVENTION

1. Field of the Invention

The present invention relates to a method for controlling character behavior in video games in which characters appear in a game space. The invention also relates to a video game machine operated in accordance with the above method and to a computer-readable recording medium on which a video game program implementing the above method is recorded.

2. Description of the Related Art

Character-raising games for raising animal characters or plant images displayed in a game space are being developed. In the character-raising games, the states of characters or images are changed over time by being fed or fertilized, or the characters or the images exhibit preset behavior in response to instructions from game players. Accordingly, the game players are able to feel as if they were actually raising plants or animals through the game screen, thereby virtually enjoying raising plants or animals.

In conventional character-raising games, however, the states of the characters or images are merely changed over time, or only preset behavior is exhibited in response to instructions from game players. Thus, even if the game players are interested in the games initially, they soon become tired of them after repeatedly playing them for a while, whereby the game fails to exhibit entertaining characteristics.

SUMMARY OF THE INVENTION

Accordingly, in view of the above background, it is an object of the present invention to provide a method for controlling character behavior that implements highly entertaining video games that allow game players to enjoy the games as if they were actually playing with characters displayed on a game screen, and also to a video game machine operated in accordance with the above method and to a computer-readable recording medium on which a video game program implementing the above method is recorded.

In order to achieve the above object, according to one aspect of the present invention, there is provided a video game machine that allows a character to appear in a game space displayed on a display screen of a display unit. The video game machine includes a temperament setting unit for providing a temperament of the character in accordance with an action performed on the character by a game player and the temperament of the character when the action is performed. A behavior-pattern storage unit stores a plurality of behavior patterns which are set in accordance with the temperament of the character. A behavior selection unit selects one of the behavior patterns in accordance with the temperament of the character. A behavior control unit causes the character to behave according to the behavior pattern selected by the behavior selection unit.

With this arrangement, a character appears in a game space displayed on the display screen of the display unit. The temperament setting of the character is changed according to a "praising" or "stroking" action performed by a game player and the temperament of the character when the action is performed. The character then behaves based on the changed temperament. That is, even with the same environments and events surrounding the character, the character behaves differently according to the character's current temperament. Accordingly, the game player is able to enjoy almost the exact feeling of playing and living with the character. It is thus possible to implement a highly entertaining video game.

According to the aforementioned video game machine, the game space may include a plurality of game scenes, and the plurality of behavior patterns may be set for a specific game scene. With this configuration, the game content becomes more complicated, thereby providing an even more entertaining video game machine.

According to the aforementioned video game machine, the behavior-pattern storage unit may store not only the behavior patterns which are set in accordance with the temperament of the character, but also behavior patterns which are set according to a lapse of a game period. The behavior selection unit may select not only one of the behavior patterns in accordance with the temperament of the character, but also one of the behavior patterns according to the lapse of the game period.

With this arrangement, the character behaves differently according to the lapse of the game period. For example, when the character is full, it ignores food. When the character becomes hungry, it demands for food. The character is awake during the day and sleeps at night. That is, the character autonomously behaves regardless of instructions given from the game player. This makes the video game highly entertaining.

The aforementioned video game machine may further include a demand-action determining unit for determining at predetermined intervals whether a demand action has been performed from the character to the game player. The behavior patterns which are set according to the lapse of the game period may include the demand actions.

This enables the game player to recognize the character's state by checking the character's behavior and to suitably perform an action on the character.

The demand action may be performed according to the temperament of the character. Accordingly, the game content can be made dynamic and entertaining.

The aforementioned video game machine may further include at least one operation unit for executing an instruction concerning the action. This makes it possible to change the temperament setting of the character and to provide dynamic aspects for the game content, thereby making the video game highly entertaining.

According to the aforementioned video game machine, the temperament setting unit may update the temperament setting at predetermined intervals. This enables the game player to give an instruction according to a change of the temperament of the character, thereby providing dynamic aspects for the game content.

According to the aforementioned video game machine, the temperament of the character may be determined in accordance with predetermined parameters. With this arrangement, the temperament setting of the character is influenced by the action done to the character by the game player.

According to the aforementioned video game machine, the temperament setting unit may include a numerical-value providing unit for providing a numerical value used as an index for the predetermined parameter according to an instruction content concerning the action and the temperament of the character when the instruction is executed, an addition unit for adding the provided numerical value for each of the predetermined parameters, and a temperament selection unit for selectively determining the temperament according to an addition result obtained by the addition unit. As a consequence, the temperament setting of the character is reliably changed, thereby making the game content dynamic and highly entertaining.

The aforementioned video game machine may further include an emotion setting unit for setting one of a plurality of emotions for the character in accordance with an instruction content concerning the action. The behavior selection unit may select one of the behavior patterns from the behavior-pattern storage unit in accordance with the temperament and emotion of the character, and the behavior control unit may cause the character to behave according to the behavior pattern selected by the behavior selection unit.

With this configuration, the character's emotion setting is changed according to an instruction from the game player, and the character behaves according to the set emotion. Thus, the game content can be made dynamic and highly entertaining.

According to the video game machine, the emotion setting unit may set the emotion in accordance with the temperament of the character when the instruction concerning the action is executed. Consequently, even with the same instruction, the character differently exhibits emotions according to the temperament of the character when the instruction concerning the action is executed.

The aforementioned video game machine may further include an emotion storage unit for storing a numerical value used as an index for each of the emotions. The emotion setting unit may include a subtraction unit for subtracting a predetermined value from the numerical values currently stored in the emotion storage unit corresponding to the emotions other than the emotion determined by the emotion setting unit according to the instruction content concerning the action and the temperament of the character when the instruction is executed, an addition unit for adding the subtracted value to the numerical value currently stored in the emotion storage unit corresponding to the emotion determined by the emotion setting unit, and an emotion selection unit for selectively determining the emotion having the greatest index value from the emotion storage unit. With this arrangement, the character's emotion can be reliably changed, thereby providing dynamic aspects for the game content and making the video game interesting.

The aforementioned video game machine may further include a character storage unit for storing a plurality of characters, and a character selection unit for selecting one of the plurality of characters.

According to the aforementioned video game machine, a plurality of icons for specifying an instruction content given by the operation unit may be indicated on the display screen of the display unit, and the operation unit may select one of the plurality of icons. With this arrangement, the game player is able to proceed with the game by specifying one of the icons, thereby speedily responding to the character's behavior.

According to another aspect of the present invention, there is provided a video game machine that allows a character to appear in a game space displayed on a display screen of a display unit. The video game machine includes a temperament setting unit for providing a temperament of the character in accordance with an action performed on the character by a game player and the temperament of the character when the action is performed. A behavior-pattern storage unit stores a plurality of behavior patterns which are set in accordance with the temperament of the character. A behavior selection unit selects one of the behavior patterns in accordance with various situations in the game space. A behavior control unit causes the character to behave according to the behavior pattern selected by the behavior selection unit.

With this arrangement, the character appears in a game space displayed on the display screen of the display unit. The temperament setting of the character is changed according to a "praising" or "stroking" action performed by a game player and the temperament of the character when the action is performed. The character then behaves based on the changed temperament according to various situations in the game space. For example, when the owner returns to the doorway, the character ignores or barks at the owner. Thus, even with the same environments and events surrounding the character, the character behaves differently according to the character's current temperament. That is, the character autonomously behaves according to various situations in the game space regardless of instructions provided from the game player. Accordingly, the game player is able to enjoy almost the exact feeling of playing and living with the character. It is thus possible to implement a highly entertaining video game.

According to still another aspect of the present invention, there is provided a method for controlling a character behavior in a video game that allows a character to appear in a game space. The method includes a game-screen output step of outputting a game screen including the character to a display screen of a display unit, a temperament setting step of providing a temperament of the character in accordance with an action performed on the character by a game player and the temperament of the character when the action is performed, a behavior-pattern selection step of selecting, according to the temperament of the character, one of a plurality of behavior patterns which are set in accordance with the temperament of the character, and a character-behavior control step of causing the character to behave according to the selected behavior pattern.

With this arrangement, the temperament setting of the character is changed according to a "praising" or "stroking" action performed by the game player and the temperament of the character when the action is performed. The character then behaves according to the changed temperament. Hence, the game player enjoys almost the exact feeling of playing and living with the character, thereby providing a highly entertaining video game machine.

According to a further aspect of the present invention, there is provided a computer-readable recording medium for recording a video game program that allows a character to appear in a game space. The game program includes a game-screen output step of outputting a game screen including the character to a display screen of a display unit, a temperament setting step of providing a temperament of the character in accordance with an action performed on the character by a game player and the temperament of the character when the action is performed, a behavior-pattern selection step of selecting, according to the temperament of the character, one of a plurality of behavior patterns which are set in accordance with the temperament of the character, and a character-behavior control step of causing the character to behave according to the selected behavior pattern.

BRIEF DESCRIPTION OF THE DRAWINGS

FIG. 6 is a table illustrating the dog's temperaments;

FIG. 7 is a table illustrating numerical values added to or subtracted from the basic parameters for setting the temperament;

FIGS. 8A and 8B are tables for illustrating numerical values based on the basic parameters and the temperaments according to the action;

FIG. 10 is a table for illustrating the emotions; and

FIGS. 11A and 11B are tables for determining the emotion according to the action.

DESCRIPTION OF THE PREFERRED EMBODIMENTS

Figure 1:
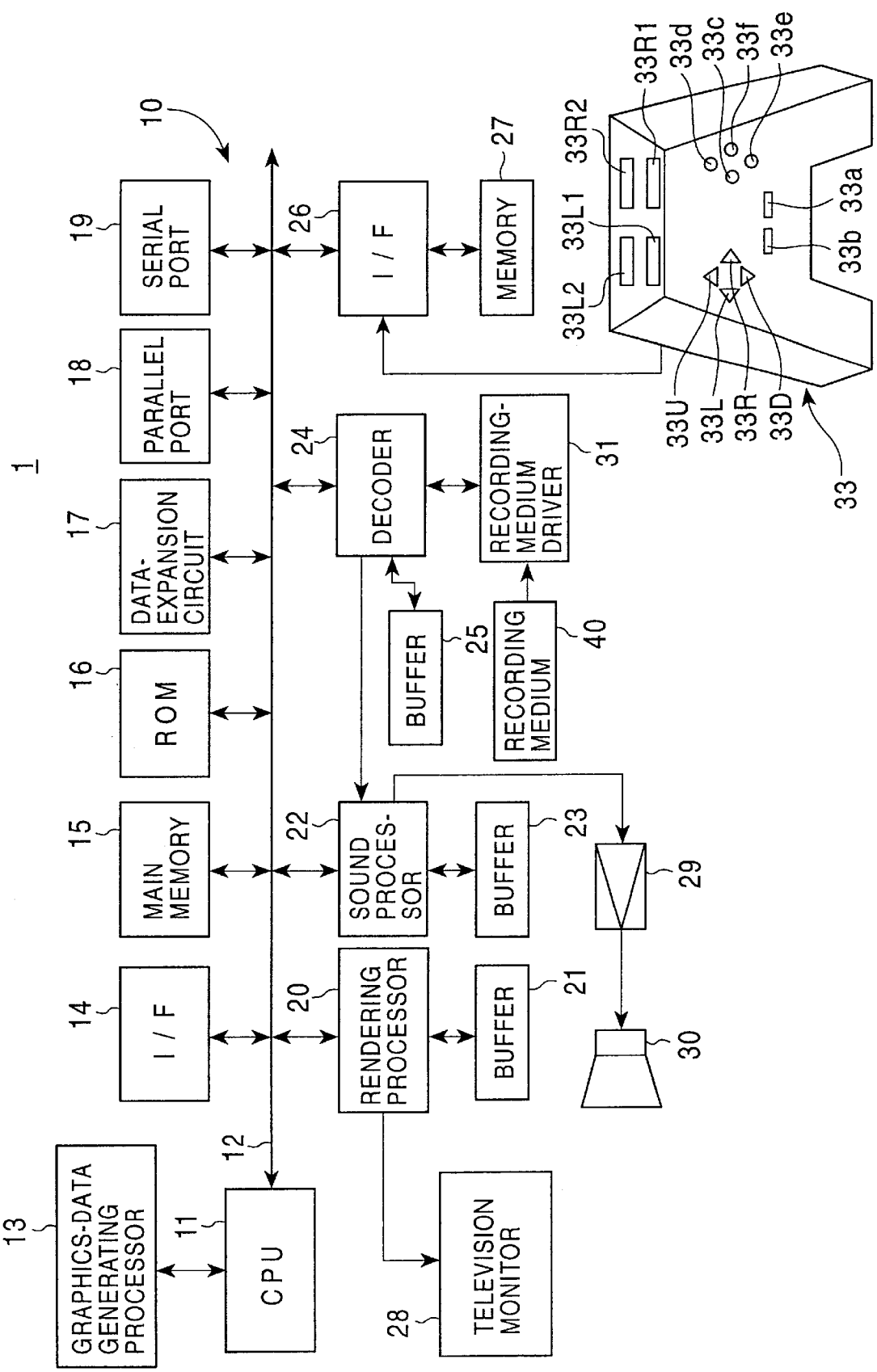
FIG. 1 is a block diagram illustrating a game system according to an embodiment of the present invention.

Referring to the block diagram illustrating an embodiment of the present invention shown in FIG. 1, a game system 1 is formed of a game machine unit 10 and a recording medium 40 for recording program data. The game machine unit 10 includes a central processing unit (CPU) 11, a graphics-data generating processor 13, an interface circuit 14, a main memory 15, a read only memory (ROM) 16, a data-expansion circuit 17, a parallel port 18, a serial port 19, a rendering processor 20, a buffer 21, a sound processor 22, a buffer 23, a decoder 24, a buffer 25, an interface circuit 26, and a memory 27. The above elements other than the CPU 11 are connected to the CPU 11 via a bus 12 formed of an address bus, a data bus, and a control bus.

A television monitor 28 (hereinafter simply referred to as the "monitor") is connected to the rendering processor 20. A speaker 30 is connected to the sound processor 22 via an amplifying circuit 29. A recording medium driver 31 is connected to the decoder 24. A controller 33 is connected to the interface circuit 26.

The configuration of the game system 1 varies according to the application. If the game system 1 is for home use, the monitor 28 and the speaker 30 are provided separately from the game machine unit 10. If the game system 1 is for commercial use, all the elements shown in FIG. 1 are stored in a single housing.

If the game system 1 is primarily formed of a personal computer or a workstation, the following elements are used in place of the above-described elements of the game system 1. A display unit of the computer or the workstation is substituted for the monitor 28. Part of the game program data recorded on the recording medium 40 or hardware on an expansion board mounted on a computer expansion slot is used instead of the data-expansion circuit 17, the rendering processor 20, and the sound processor 22. Hardware on an expansion board mounted on a computer expansion slot is substituted for the interface circuit 14, the parallel port 18, the serial port 19, and the interface circuit 26. An area of the main memory 15 or an-expansion memory (not shown) is used in place of the buffers 21, 23, and 25.

In this embodiment, it is assumed that the game system 1 is for home use.

The individual elements illustrated in FIG. 1 are discussed in greater detail below. The graphics-data generating processor 13, which serves as a coprocessor of the CPU 11, performs calculations of fixed-point matrices or vectors of, for example, coordinate transforms or light-source calculations, by executing parallel processing. More specifically, the graphics-data generating processor 13 mainly executes the following processing. Based on two-dimensional or three-dimensional coordinate data, translation data, and rotation data of each vertex of image data supplied from the CPU 11, the graphics-data generating processor 13 determines the address on a display area at which the image to be processed is positioned, and returns the address data to the CPU 11. The graphics-data generating processor 13 also calculates the luminance of the image in accordance with the distance from a light source, which is virtually set.

The interface circuit 14 serves as an interface for peripheral devices, such as mice and pointing devices, for example, trackballs. The ROM 16 stores program data, which serves as the operating system of the game system 1. In terms of a personal computer, the program data corresponds to the Basic Input Output System (BIOS).

The data-expansion circuit 17 expands compressed images which are compressed by an intra-coding method in compliance with the Motion Picture Experts Group (MPEG) for moving pictures or the Joint Photographic Experts Group (JPEG) for still images. Expansion processing includes decoding processing (decoding data encoded by the variable length code (VLC)), dequantizing processing, inverse discrete cosine transform (IDCT) processing, and reproduction processing of intra-coded images.

The rendering processor 20 draws images onto the buffer 21 based on a rendering command issued by the CPU 11.

The buffer 21 is formed of a display area and a non-display area. The display area is an expansion area for data to be displayed on the monitor 28. In this embodiment, the non-display area is a storage area not only for data for defining skeletons, model data for defining polygons, animation data for moving models, and pattern data for indicating the content of each animation, but also for texture data and color palette data.

The texture data is two-dimensional image data. The color palette data is data for specifying the color of the texture data. The texture data and the color palette data are read out from the recording medium 40 at one time or a plurality of times in accordance with the progress of a game. The texture data and the color palette data have been recorded on the non-display area of the buffer 21 by the CPU 11.

The rendering commands are issued for rendering a three-dimensional image by using polygons and for rendering regular two-dimensional images. The polygons are two-dimensional polygonal virtual graphics, and in this embodiment, they are triangles or quadrilaterals.

The rendering command for rendering three-dimensional images by using polygons includes polygon-vertex address data of a polygon vertex on the display area of the buffer 21, texture address data indicating the storage location in the buffer 21 of texture data to be clipped on polygons, color-palette address data representing the storage location in the buffer 21 of color palette data indicating the color of the texture data, and luminance data representing the luminance of the texture.

Among the above-described items of data, the polygon-vertex address data on the display area can be obtained in the following manner. The graphics-data generating processor 13 performs coordinate transform, based on the amounts by which polygons are translated and rotated on the screen (viewpoint), on polygon-vertex coordinate data in a three-dimensional space calculated by the CPU 11, thereby transforming it into polygon-vertex coordinate data in a two-dimensional space. The luminance data is determined by the graphics-data generating processor 13 based on the distance between the polygon-vertex coordinate data obtained by performing coordinate transform as described above and a virtually located light source.

The polygon-vertex address data represents the address of the polygon vertex on the display area of the buffer 21. The rendering processor 20 writes texture data corresponding to the zone of the display area of the buffer 21 represented by the three- or four-sided polygon address data.

A single object is formed of a plurality of polygons. The CPU 11 stores three-dimensional coordinate data of each polygon in the buffer 21 in correspondence with the vector data of the associated skeleton. When game characters are moved on the screen by operating the controller 33, in other words, when the character's movements are expressed or when the position from which the characters are viewed (the viewpoint position) is changed, the following processing is executed.

The CPU 11 provides the graphics-data generating processor 13 with the three-dimensional coordinate data of vertices of each polygon stored in the non-display area of the buffer 21 and with the translation data and the rotation data of each polygon determined by the skeleton coordinates and the rotational data of the skeleton.

The graphics-data generating processor 13 then sequentially determines three-dimensional coordinate data of the individual polygons after being translated and rotated, based on the three-dimensional polygon-vertex coordinate data and the amounts by which the polygons have been translated and rotated.

Among the three-dimensional polygon coordinate data obtained as described above, horizontal and vertical coordinate data is supplied to the rendering processor 20 as the address data on the display area of the buffer 21, i.e., as polygon-vertex address data.

The rendering processor 20 then writes texture data represented by preallocated texture address data into a triangle or quadrilateral display area of the buffer 21 represented by the three- or four-sided polygon vertex address data. This makes it possible to display objects obtained by clipping the texture data on a plurality of polygons on the screen of the monitor 28.

The rendering command for rendering a regular two-dimensional image is formed of vertex address data, texture address data, color palette address data, which represents the storage location in the buffer 21, of color palette data indicating the color of the texture data, and luminance data indicating the luminance of the texture data. Among the above-mentioned items of data, the vertex address data is coordinate data obtained by performing coordinate transform by the graphics-data generating processor 13 on the two-dimensional vertex coordinate data calculated by the CPU 11, based on the amounts by which the polygons have been translated and rotated.

The sound processor 22 stores adaptive differential pulse code modulation (ADPCM) data read from the recording medium 40 in the buffer 23, and the ADPCM data stored in the buffer 23 is used as a sound source. The sound processor 22 then reads the ADPCM data from the buffer 23 at a clock frequency of, for example, 44.1 kHz.

The sound processor 22 then performs processing, such as pitch conversion, noise addition, envelope setting, level setting, reverb addition, etc., on the ADPCM data read from the buffer 23.

If the sound data read from the recording medium 40 is pulse code modulation (PCM) data compliant with, for example, the compact disk-digital audio (CD-DA) format, it is converted into ADPCM data by the sound processor 22.

The processing to be executed on the PCM data by using program data is directly performed in the main memory 15. The PCM data is then supplied to the sound processor 22 and is converted into ADPCM data. Subsequently, the above-described various operations are conducted on the ADPCM data, which is then output from the speaker 30 as sound.

The recording medium driver 31 may be a compact disk-read only memory (CD-ROM) drive, a hard disk drive, an optical disc drive, a floppy disk drive, a silicon disk drive, or a cassette-type medium reader. The recording medium driver 31 reads data, such as images, sound, or program data from the recording medium 40 and supplies the read data to the decoder 24. The decoder 24 then executes error correction processing by using error correction code (ECC) on the reproduced data output from the driver 31, and supplies the error-corrected data to the main memory 15 or the sound processor 22.

The memory 27 is, for example, a card-type memory, and is used for storing various parameters of games, such as the current setting of a game.

The controller 33, which serves as an operation unit, which can be operated externally, has a first left button 33L1, a second left button 33L2, a first right button 33R1, a second right button 33R2, an up-direction key 33U, a down-direction key 33D, a left-direction key 33L, a right-direction key 33R, a start button 33a, a select button 33b, a first button 33c, a second button 33d, a third button 33e, and a fourth button 33f. The controller 33 outputs an operation signal according to the operation performed by a game player.

The up-direction key 33U, the down-direction key 33D, the left-direction key 33L, and the right-direction key 33R are used for providing to the CPU 11 commands for moving characters up and down and in the left and right directions, respectively, on the screen, and for providing commands for moving an icon on the menu screen.

The start button 33a is used for instructing the CPU 11 by a game player to start the game program data loaded from the recording medium 40. The select button 33b, is used for instructing the CPU 11 by the game player to select one of the items of game program data loaded into the main memory 15 from the recording medium 40.

The functions of the first button 33c, the second button 33d, the third button 33e, the fourth button 33f, the first left button 33L1, the second left button 33L2, the first right button 33R1, and the second right button 33R2 vary according to the game program data loaded from the recording medium 40.

The recording medium 40 may be a CD-ROM, a hard disk, an optical disc, a floppy disk, a semiconductor memory, etc., and data, such as images, sound, game programs, and so on, are stored in the recording medium 40, as stated above.

An overview of the operation of the above-described game system 1 is as follows.

A power switch (not shown) is turned on to activate the game system 1. If the recording medium 40 is loaded in the recording medium driver 31, the CPU 11 instructs the recording medium driver 31 to read program data from the recording medium 40 based on the operating system stored in the ROM 16. Accordingly, the recording medium driver 31 reads images, sound, and program data from the recording medium 40.

The read images, sound, and program data are supplied to the decoder 24 which then performs error correction processing on the read data. The error-corrected image data is supplied to the data-expansion circuit 17 via the bus 12 and undergoes the above-described expansion processing in the data-expansion circuit 17. Subsequently, the image data is supplied to the rendering processor 20 and is written into the non-display area of the buffer 21 by the rendering processor 20.

Meanwhile, the error-corrected sound data is supplied to the main memory 15 or the sound processor 22, and is written into the main memory 15 or the buffer 23, respectively.

The error-corrected program data is supplied to and written into the main memory 15. Thereafter, the CPU 11 proceeds with the game in accordance with the game program data stored in the main memory 15 and the instructions provided by a game player through the controller 33. That is, the CPU 11 appropriately controls image processing, sound processing, and internal processing based on the instructions provided by the game player through the controller 33.

In this embodiment, the CPU 11 performs the following image processing control: calculations of skeleton coordinates and calculations of polygon-vertex coordinate data from pattern data corresponding to animation instructions to characters, supplying the obtained three-dimensional coordinate data and viewpoint position data to the graphics-data generating processor 13, and issuing rendering commands representing luminance data and address data indicating the positions of the display area of the buffer 21 determined by the graphics-data generating processor 13.

The CPU 11 performs sound processing control, such as issuing sound output commands to the sound processor 22 and designating the level, the reverb, etc. The CPU 11 also performs internal processing control, such as making calculations according to the operation of the controller 33.

Figure 2:
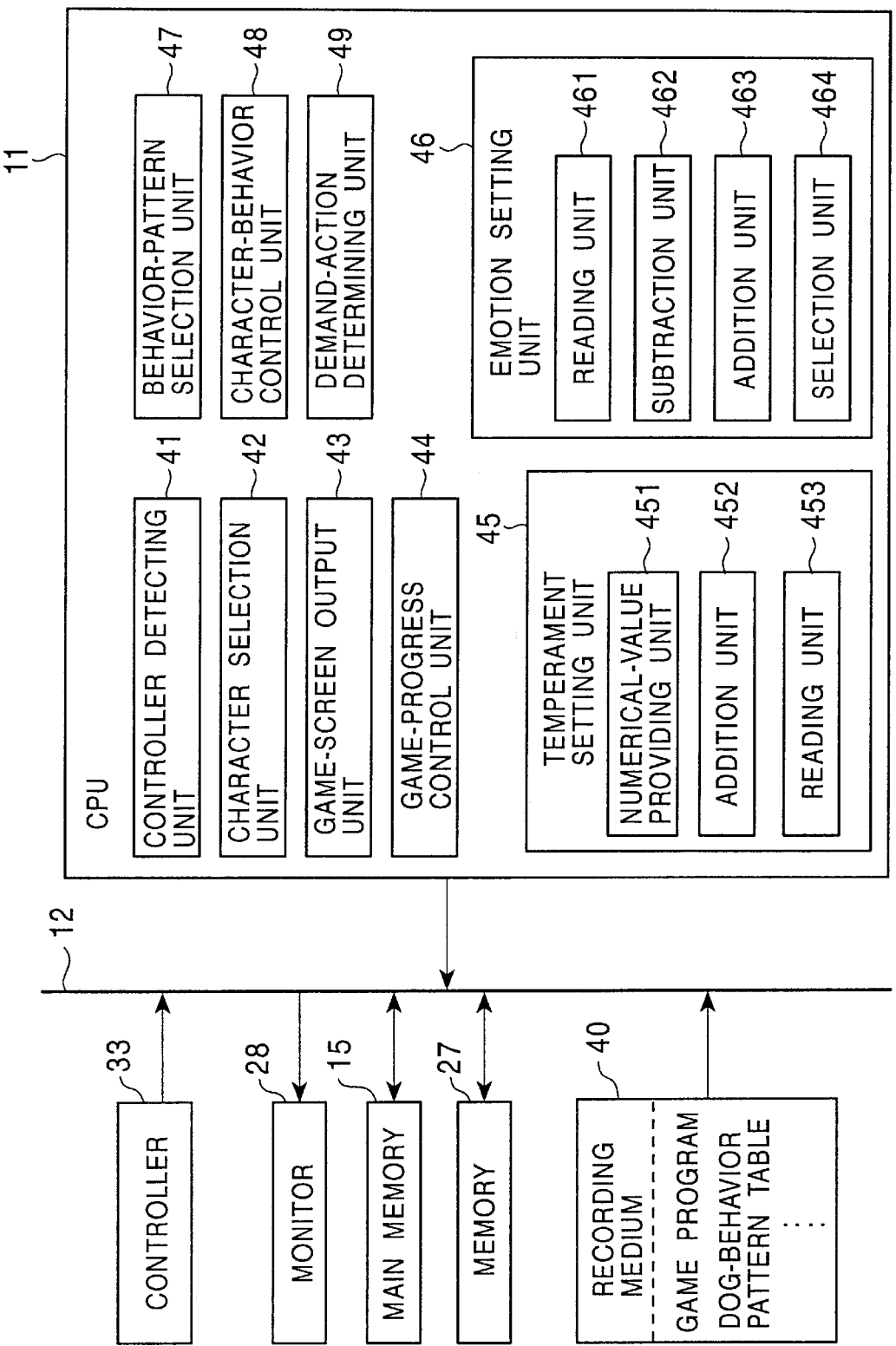
FIG. 2 is a block diagram illustrating units for implementing the functions of a CPU for use in the game system shown in FIG. 1.

FIG. 2 is a block diagram illustrating units for implementing the functions of the CPU 11. The CPU 11 includes a controller detecting unit 41, a character selection unit 42, a game-screen output unit 43, a game-progress control unit 44, a temperament setting unit 45, an emotion setting unit 46, a behavior-pattern selection unit 47, a character-behavior control unit 48, and a demand-action determining unit 49.

The controller detecting unit 41 is used for detecting the on off operation of the controller 33 based on an operation signal transmitted from the operation button of the controller 33. The character selection unit 42 is used for selecting one of a plurality of characters displayed on the monitor 28 based on an operation signal output by operating the controller 33.

The game-screen output unit 43 reads the game screen from the main memory 15 or the recording medium 40 in accordance with the content of the game, and outputs the read game screen onto the monitor 28. The game screens include a plurality of game scenes, such as scenes in which the game proceeds inside a house and scenes in which the game proceeds outside the house. The game-progress control unit 44 proceeds with the game according to a preset program.

The temperament setting unit 45 is used for setting and changing the characters' temperament (providing the temperament to the characters) appearing in the game. The temperament setting unit 45 is formed of the following elements. A numerical-value providing unit 451 provides specific numerical values used as indices for predetermined parameters (elements) for determining the temperament in accordance with the operation content (instruction content) of the controller 33 and with the character's temperament when the operation is provided (when the instruction is executed). An addition unit 452 adds the numerical value. A reading unit 453 reads the temperament corresponding to the addition result obtained by the addition unit 452 from the recording medium 40. In the recording medium 40, the addition results and the temperaments are stored in correspondence with each other. The temperament setting of the character appearing in the game is changed to the temperament read by the reading unit 453.

The numerical-value providing unit 451 reads the numerical value as an index from a storage unit, such as the recording medium 40, for storing the characters' temperaments and the parameters in correspondence with each other, and provides the read numerical value for the parameter. The reading unit 453 serves as a selection unit for selectively determining the character's temperament according to the addition result obtained by the addition unit 452. Details of the temperament setting operation will be discussed later.

The emotion setting unit 46 sets and changes the emotions of the characters appearing in the game, and is formed of the following elements. A reading unit 461 reads and determines one of the emotions from an emotion determining table according to the instruction input through the controller 33 and the character's temperament when the instruction is executed. A subtraction unit 462 subtracts a certain numerical value from the index values of the emotions other than the emotion determined by the reading unit 461. An index value has been provided as an initial value for each emotion and has been stored in the storage unit, such as the recording medium 40. An addition unit 463 adds the subtracted value to the index value (which is stored in the storage unit) of the emotion determined by the reading unit 461. A selection unit 464 selectively determines the emotion provided with the highest index value from the storage content of the storage unit. The character's emotion setting is changed to the emotion determined by the selection unit 464. Details of the emotion setting operation will be described later.

The behavior-pattern selection unit 47 selects one of a plurality of behavior patterns preset for the characters according to the various situations in a game space. More specifically, the behavior-pattern selection unit 47 selects one behavior pattern corresponding to the game scene in accordance with the elapsed time of the game, or selects one behavior pattern by determining the currently set character's temperament and emotion (only the temperament may be determined, or both the temperament and the emotion may be determined according to the game scene).

Many different behavior patterns concerning a predetermined game scene selected from a plurality of game scenes are stored in the storage unit, such as the recording medium 40, as a dog-behavior pattern table in this embodiment. Accordingly, one behavior pattern is read from the dog-behavior pattern table according to various situations, such as the temperament and emotion set for the characters, and the elapsed time of the game.

The character-behavior control unit 48 controls the behavior of the character appearing in the game. More specifically, the character-behavior control unit 48 controls the character to behave in response to the behavior pattern selected by the behavior-pattern selection unit 47 regardless of instructions given by a game player through the controller 33. The character-behavior control unit 48 also controls the character to behave in response to the behavior pattern selected by the behavior-pattern selection unit 47 while considering instructions given by a game player through the controller 33.

The demand-action determining unit 49 determines whether there is any predetermined demand, such as walking or feeding, from the character. That is, when a predetermined demand is made by the character, the behavior pattern corresponding to the demand is read from the dog-behavior pattern table stored in the storage unit, such as the recording medium 40, and the behavior pattern is displayed on the monitor 28.

For description, the elements between the monitor 28 and the bus 12 and the elements between the recording medium 40 and the bus 12 are omitted.

A brief description is given below of the content of the game to be executed by the video game machine according to the present invention.

The following game content is stored in the recording medium 40. One of the plurality of characters is selected and is caused to behave according to the elapsed time of the game. The temperament and the emotion setting of the selected character is changed in accordance with a predetermined condition, and the character is caused to behave according to the temperament and the emotion. The game player raises the character while communicating with it by giving instructions through the controller 33.

More specifically, the game played in this embodiment is a dog raising game in which a desired dog (for example, a three-month-old puppy) is selected (given) from a plurality of types of dogs, and is raised. The game player trains the dog for various actions, such as "give me your paw", "sit", "stay", "OK", "errand", and also raises the dog by feeding, walking, doing house-training, etc. In the meantime, it is checked how well the dog has been raised. For example, while the game player is walking the dog, the neighbors test whether the dog can do various actions, such as "give me your paw", "errand", etc., or check how faithful the dog is to the owner, i.e., the game player.

It is determined whether the dog can meet the requirements checked by the neighbors according to how well the game player has raised the dog so far. When the dog shows satisfactory results, the game player feels satisfied. In this manner, according to the game used in this embodiment, the game player is able to feel as if he/she actually kept a dog in a game space.

In most conventional character-raising games, the parameter values are increased by instructions from a game player, thereby providing specific characteristics for the character. In this game, however, it is set that the dog appears to behave by thinking by itself. Thus, the game player is required not only to provide specific instructions, such as increasing the parameter values, as has been performed in known art, but to play the game while having a good relationship with the dog. Since the game constructed in accordance with this embodiment is different from conventional character-raising games, it has the following features indicated by (1) through (4).

(1) Changing the Temperament Setting

In this game, the setting of one of a plurality of types of temperaments, indicated by A, B, C, D, E, F, G, H, I, and J, as shown in FIG. 6, of a given (selected) dog is changed during the period of the game, for example, every day, according to predetermined conditions. Any one of the temperaments is set when the dog is given, and is changed later according to the various operations of the game player while raising the dog.

According to the temperament setting changed in the above manner, an event or the dog's action (behavior) is varied, thereby providing the game with dynamic aspects and making it highly entertaining. In this game, it is not essential that all the temperaments shown in FIG. 6 are provided, and some of them may be selected or other temperaments may be added according to the content of the game.

The temperament setting is changed, for example, in the following manner. As partly shown in FIG. 7, certain numerical values (zero, positive, or negative values) used as indices are added to or subtracted from, according to the content indicated in the "conditions for increasing and decreasing the numerical value" column, the basic parameters a, b, c, d, e, f, g, h, and i (merely indicated alphabetically for convenience), which count towards determining the temperament. According to the resulting cumulative value, the temperament is selectively determined. In this embodiment, the cumulative value of each parameter after being added or subtracted is set in such a manner that the center value is, for example, 0, and the absolute upper maximum and the lower maximum are, for example, 100.

The "conditions for increasing and decreasing the numerical value" for the basic parameters a, b, c, and d are shown in FIG. 7. The conditions for the other basic parameters are suitably set, and the index values corresponding to the conditions are also provided.

When the game player performs a predetermined action, such as "praising" or "stroking", on the dog, a predetermined numerical value corresponding to the action is added to the index value in accordance with the current dog's temperament, as indicated by the parameter temperament tables shown in FIGS. 8A and 8B. It is now assumed that the current dog's temperament is A, and that the "praising" action is done. For example, concerning the basic parameter a, the numerical value −2 is read from the parameter temperament table by the numerical-value providing unit 451. Concerning the basic parameter c, the numerical value +1 is read from the parameter temperament table by the numerical-value providing unit 451.

If the "stroking" action is done, the numerical value +2 is read for the basic parameters a and c from the parameter temperament table by the numerical-value providing unit 451. In this manner, as indicated by the parameter temperament tables shown in FIGS. 8A and 8B, the numerical values set for the individual basic parameters are read by the numerical-value providing unit 451 according to the dog's current temperament, and the read values are added for each parameter by the addition unit 452. The parameter temperament tables shown in FIGS. 8A and 8B are preset for all the actions that influence the basic parameters. Any actions that affect the basic parameters may be set as desired.

If the cumulative value is a negative value, a predetermined positive value is added by the addition unit 452. If the cumulative value is a positive value, a predetermined negative value is added by the-addition unit 452. The cumulative value can thus be adjusted. Among the adjusted values, the greatest and the second greatest absolute values are selected. Then, based on the two selected basic parameters, the temperament to be set is determined by referring to the temperament conversion table shown in FIG. 9. The selection of the two basic parameters and the determination of the corresponding temperament are performed by the reading unit 453.

For example, it is now assumed that the two selected basic parameters are c and b. By referring to column c and row b of the temperament conversion table shown in FIG. 9, the temperament setting is changed to C if c is a positive value and b is a negative value. If c is a negative value and b is a positive value, the temperament setting is changed to H. In selecting two basic parameters, the unadjusted cumulative values may be used. Alternatively, the unadjusted cumulative values may be used only for specific basic parameters. The parameter temperament tables and the temperament conversion table shown in FIGS. 8A, 8B, and 9 have been stored, together with the calculation expressions, in a storage unit, such as in the recording medium 40.

(2) Changing the Emotion Setting

In the game used in this embodiment, one of the four emotions, such as "joy", "anger", "sadness", and "happiness", of a given (selected) dog, is set (determined), as shown in FIG. 10, in accordance with the action performed on the dog by the game player and the dog's temperament when the action has been made. According to the newly set emotion, the dog's action (behavior) is changed, thereby making the game dynamic and highly entertaining.

The emotion setting is changed every time the game player performs some action on the dog, for example, in the following manner. The dog's emotion toward the action made by the game player is first determined. More specifically, as indicated by the emotion determining tables illustrated in FIGS. 11A and 11B, when the "praising" action is done, the emotion "joy" is exhibited if the dog's temperament is A, and the emotion "happiness" is exhibited if the dog's temperament is C. When the "stroking" action is done, the emotion "anger" is exhibited if the dog's temperament is A, and the emotion "joy" is exhibited if the dog's temperament is B. The emotion is read from the emotion determining table by the reading unit 461 according to the action performed by the game player.

The four emotions are represented by numerical values used as indices, and the total value of the four emotions is set to be 100. If the emotion "joy" is exhibited when a predetermined action is done, 1 is subtracted from each of the three emotions "anger", "sadness", and "happiness" by the subtraction unit 462, and 3 is added to the emotion "joy" by the addition unit 463. If the emotion "anger" is exhibited when a predetermined action is done, 1 is subtracted from each of the three emotions "joy", "sadness", and "happiness" by the subtraction unit 462, and 3 is added to the emotion "anger" by the addition unit 463. The emotion having the greatest value is selected from the four emotions by the selection unit 464, and the selected emotion is set to be the dog's current emotion. The emotion determining tables illustrated in FIGS. 11A and 11B have been stored, together with calculation expressions, in a storage unit, such as in the recording medium 40.

In this game, it is not essential that the four emotions "joy", "anger", "sadness", and "happiness" be required. Only two or three emotions may be selected from the four emotions. Alternatively, other emotions may be added to the four emotions.

(3) Demands from the Dog to the Game Player

In the game used in this embodiment, various demands or behavior are autonomously made from the dog to the game player regardless of instructions given from the owner, i.e., the game player. More specifically, the dog makes various demands for, for example, "walking", "playing", "cleaning after doing the toilet", "stroking", "feeding", etc., according to predetermined conditions, and also makes some action in response to "persistent orders" (rebellious action against the owner). It is determined whether the above-mentioned demands, except for a demand for "feeding", are performed according to the relationships between the dog's temperament shown in FIG. 6 and the cumulative values of the predetermined basic parameters partly shown in FIG. 7.

According to the above-described demands, the game can be made dynamic and highly entertaining. Meanwhile, the game player is able to recognize the dog's current state by checking the dog's behavior, thereby performing a suitable action on the dog. In this game, it is not necessary that all the demands be provided. Some of the demands may be selected, or other demands may be added according to the content of the game.

It is determined whether, for example, a demand for "walking", is performed according to the relationship between the dog's temperament and the cumulative value of the predetermined basic parameter. If the dog's temperament is A, a demand for "walking" is not made when the cumulative value of the predetermined basic parameter is less than a predetermined value. When the cumulative value of the predetermined basic parameter is not less than the predetermined value, a demand for "walking" is performed. In this manner, a predetermined value is set for the dog's temperament, and the cumulative value of the corresponding basic parameter is compared with the predetermined value by the demand-action determining unit 49, which is one of the functions provided for the CPU 11, thereby determining whether the demand is actually carried out. The relationships between the dog's temperament and the cumulative values of the basic parameters are stored as a table in a storage unit, such as in the recording medium 40. Other demands may be executed and determined in a manner similar to a demand for "walking" as discussed above.

In making a demand for "walking", the dog takes, for example, the following action, i.e., going to the doorway and holding a leash in the mouth, and begging the owner to go for a walk. In this case, the dog behaves in various ways according to its temperament, such as casting an upward glance, wagging its tail, looking sad, and so on. In making a demand for "playing", the dog takes, for example, the following action, i.e., holding a toy in the mouth and begging the owner to play. In this case, the dog behaves in various ways according to its temperament, such as wagging its tail, barking, etc. When making a rebellious action against a persistent order, the dog tries to avoid the order by moving to the corner of a room or moving to another room.

The dog's behavior patterns corresponding to the above-mentioned various demands and actions in response to persistent orders are stored in a storage unit, such as in the recording medium 40 as a dog-behavior pattern table. Such demands and actions are indicated in correspondence with the dog's temperament according to the game scene. When there is a predetermined demand from the dog (i.e., when it is determined by the demand-action determining unit 49 that a demand has been made), the corresponding behavior pattern is read from the dog-behavior pattern table by the behavior-pattern selection unit 47 and is displayed on the monitor 28.

(4) Versatility in the Dog's Action

In the game used in this embodiment, the dog is kept inside the house and makes various actions (behavior) according to the dog's temperament and emotions. As the dog's actions, for example, "reacting to the owner who has just returned to the room", "positioning in the room", "toilet", "playing with a toy", etc. are preset.

The above-mentioned actions (behavior) may be determined according to the relationships between the dog's temperament shown in FIG. 6 and the cumulative values of the predetermined parameters shown in FIG. 7, or they may be determined only by the dog's temperament or a combination of the dog's temperament and emotions. It is thus possible to provide versatile aspects for the game, thereby making the game highly entertaining. In this game, it is not essential that the above-described actions be entirely provided. Some of the actions may be selected, or other actions may be added according to the content of the game.

For example, in regards to "reacting to the owner who has just returned to the room", when the owner returns to the doorway, the dog may ignore or bark at the owner, or may show a friendly attitude toward the owner according to the dog's temperament or the cumulative value of the predetermined basic parameter. The relationships between the dog's temperament and the cumulative values of the basic parameters are stored as a table in a storage unit, such as in the recording medium 40.

Concerning "positioning in the room", the place in the room at which the dog is located is determined by a combination of the dog's temperament and emotions. That is, the dog may be positioned far back in the room or at the corner of the room according to a combination of the dog's temperament and emotions. The relationships between the dog's temperament and emotions are stored as a table in a storage unit, such as in the recording medium 40.

Regarding "playing with a toy", it is determined whether the dog plays with a toy according to the index value of a toy parameter set for, for example, a cuddly bear, a ball, etc. That is, the toy parameters are provided for the individual toys as initial values according to the dog's temperament. By executing "playing with a toy", a predetermined value for each toy is added (or subtracted) by an addition unit (or a subtraction unit), which is one of the functions provided for the CPU 11.

The above-mentioned predetermined value varies according to the dog's temperament, and an extra value is further added or subtracted by "praising", "stroking", or "feeding" the dog immediately after the dog has played with a toy. An extra value is also added or subtracted according to the dog's emotion. When the cumulative value is small, the dog ignores or escapes from a toy. As the cumulative value increases, the probability of playing with a toy becomes higher. The relationships between the cumulative values and the probability of playing with a toy are stored as a table in a storage unit, such as in the recording medium 40.

The above-described various actions (behavior) exhibited by the dog are stored as a dog-behavior pattern table in correspondence with the dog's temperament according to the individual game scenes in a storage unit, such as in the recording medium 40. The corresponding behavior pattern is read from the dog-behavior pattern table and is displayed on the monitor 28.

An overview of the dog-raising game executed in the video game machine according to the present invention is described in detail below based on the screen displayed on the monitor 28.

Figure 3:
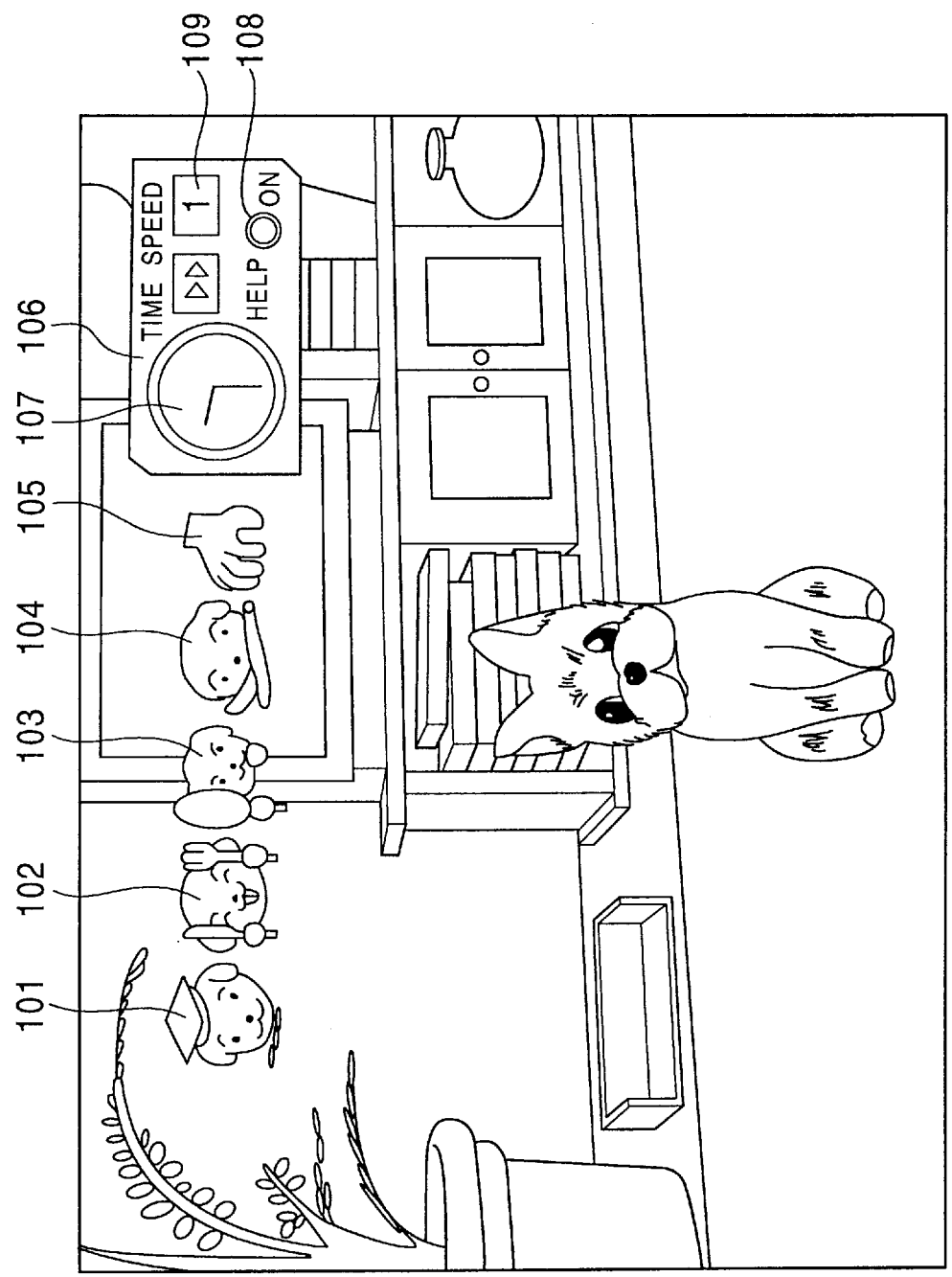
FIG. 3 illustrates one scene of the game.

FIG. 3 illustrates the game scene in which the dog is sitting in a living room. At the top of the screen, a "training" icon 101, a "meal" icon 102, a "grooming" icon 103, a "playing" icon 104, and a "catching" icon 105 are sequentially indicated from the left. On the monitor 28, within the house, not only the living room, but also a western-style room, a kitchen, a bathroom, etc. can be displayed, and outside the house, scenes for walking the dog are displayed. Predetermined icons, such as those shown in FIG. 3, are indicated according to the game scene. As the scenes for walking the dog, game scenes, such as a residential area, a shopping area, a suburb, a promenade, a park, and so on, are displayed.

The individual icons 101 through 105 are command icons executable on the displayed game scene. At the right corner of the screen, a clock icon 106 is indicated. Within the clock icon 106, an analog clock 107 indicating the time elapsed within the game is indicated at the left, a button 108 for adjusting the rapidity of the time flow in three stages is indicated at the bottom right, and a window 109 for indicating the rapidity of the time flow by numbers 1, 2, and 3, is provided at the upper right. The rapidity of the time flow can be progressively adjusted by pressing the button 108 through the operation of the controller 33.

When the "training" icon 101 is selected by operating the controller 33, a plurality of command icons, such as "call", "stay", "OK", "give me your paw", "sit", "another paw", "down", "stand", "errand", etc., are indicated. The above commands can be used in the scenes within the house, such as the doorway, the living room or the kitchen, or the park outside the house, according to the operation of the controller 33. The "call" icon is a command for calling the dog located at a position away from the owner. When the dog approaches and is close to the owner after executing this command, the other commands starting from the "stay" command are ready to be executed.

The command "stay" is a command (order) for temporarily stopping the action to be made by the dog, such as instructing the dog to wait for eating food. The command "OK" is a command for allowing the dog to make action. The command "give me your paw" is a command for instructing the dog to stretch one of the front paws to the palm of the owner. The command "sit" is a command for instructing the dog to sit. The command "another paw" is a command for instructing the dog to stretch the other front paw to the palm of the owner. The command "down" is a command for instructing the dog to lie down on the ground. The command "stand" is a command for instructing the dog to stand on its two rear paws. The command "errand" is a command for instructing the dog to deliver, for example, a letter, to a specific person. When the dog fulfills an order from the owner, the owner praises, strokes, or feeds the dog. When the dog cannot execute an order from the owner, the owner scolds the dog. The owner's actions enable the dog to reliably execute orders from the owner.

By pressing predetermined buttons of the controller 33, four "training" commands, such as "praising", "stroking", "scolding", and "hitting", can be selected, though they are not shown as icons. The training commands are used for all the dog's actions selected by the icons, thereby changing the dog's temperament parameters and the emotion parameters.

In this game, for example, concerning the toilet, it is set that the dog "poops" at home and "urinates" while the owner is walking the dog. At the start of the game when the dog is not yet trained, the dog "poops" or "urinates" in unspecified places. Accordingly, to train the dog to "poop" or "urinate" in specified places, when the dog commences an action to "poop" (stoop down) or "urinate" (raise its rear leg), the "catching" icon 105 is selected to catch the dog and move it to the specified place. If the dog successfully "poops" or "urinates" in the specified place, the owner praises or strokes the dog. This is repeatedly performed every time the dog goes to the toilet, thereby training the dog to "poop" or "urinate" in specified places. If the dog "poops" or "urinates" in unspecified places, the owner scolds or hits the dog, thereby making the dog realize that it has made a mistake and that it should go to the specified places.

That is, the game is programmed in the following manner. By praising or stroking the dog when the dog has exhibited behavior which satisfies an order from the owner, the probability of executing a behavior pattern matching an order becomes higher. Conversely, by scolding or hitting the dog when the dog has exhibited behavior against an order from the owner, the probability of executing a behavior pattern against an order becomes lower. According to this programming, the "training" commands, such as "praising", "stroking", "scolding", and "hitting", are suitably executed in response to the dog's behavior, thereby making it possible to properly train the dog.

In the kitchen scene of the game screen, when the "meal" icon 102 is selected, a "dinner" icon is indicated. By selecting the "dinner" icon, a plurality of "food" icons are indicated. By further selecting one of the "food" icons, the dog is fed.

In the living-room scene or the western-style room scene in the house, or in the park scene outside the house of the game screen, if the "grooming" icon 103 is selected, a "brushing" icon is indicated. By selecting the "brushing" icon, the dog can be brushed. At first, the dog is unwilling to be brushed, but later, the dog quietly accepts being brushed. This may vary according to the dog's temperament. By brushing the dog, the emotions are changed according to its temperament. If the dog is not taken care of for a certain period, the dog suffers from various diseases. Conversely, if the dog is excessively taken care of, the dog also gets a disease.

When the "play" icon 104 is selected, icons, such as a cuddly bear, a trumpet, a ball, etc., are indicated on the monitor 28. By selecting one of the icons, the dog is able to play with the selected toy. Some dogs like playing with toys, and other dogs do not, which is determined by the dog's temperament.

Although it is not shown in FIG. 3, a "diary" command is selected to save game data. At the start of the game, optional settings, such as loading the game data, changing the cursor speed, the message speed, or sound, and so on, can be made. Additionally, while the owner is walking the dog, the neighbors check how well the owner has trained the dog so far by testing whether the dog is able to perform actions, such as "give me your paw", "sit", "errand", etc., or by testing the owner for item D. Additionally, there may be a demand for a new training item from the neighbors. The above-mentioned situation is recorded in the "diary".

Although it is not shown in FIG. 3, by selecting a "walking" command, the owner is able to walk the dog in the residential area, the shopping area, the suburb, the promenade, or the park. The owner is also able to take the dog to the veterinary clinic.

Figure 4:
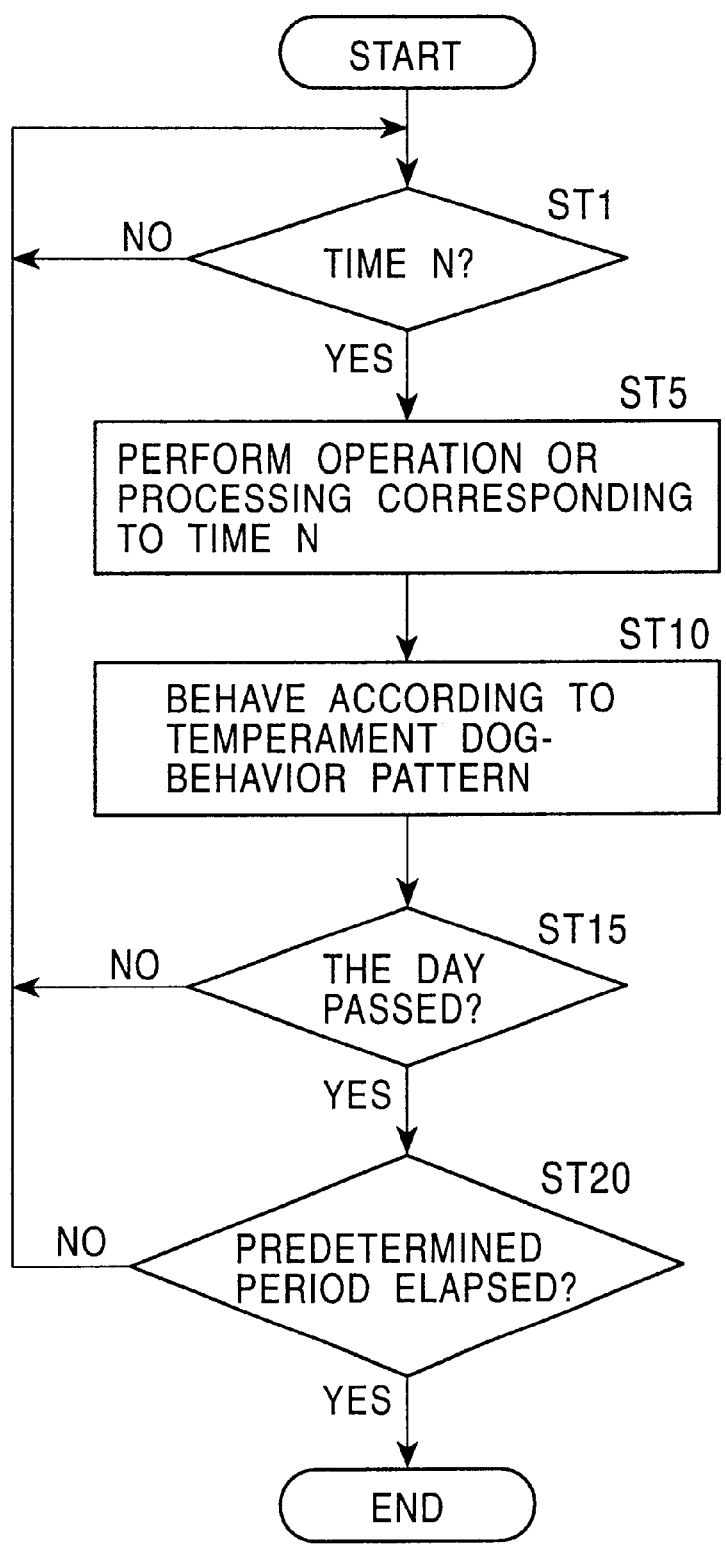
FIG. 4 is a flow chart illustrating the game procedure.
Figure 5:
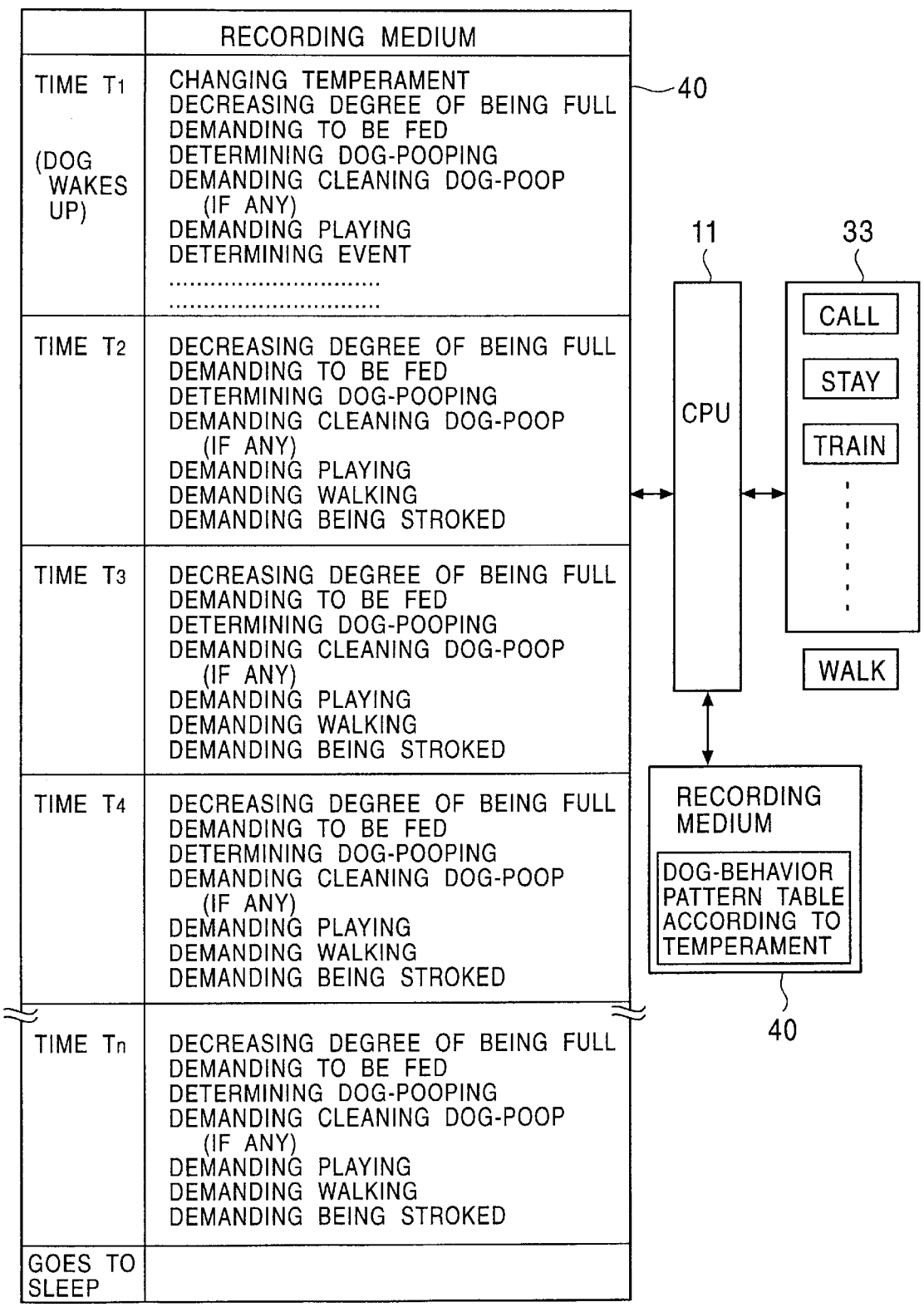
FIG. 5 illustrates the flow of the character's operation for one day in the game.

A description is now given of the outline of the game procedure with reference to the flow chart of the procedure of the dog-raising game shown in FIG. 4 and the flow of the dog's actions for one day shown in FIG. 5.

The types of dogs are first displayed on the monitor 28. The game player selects (obtains) a desired dog from the displayed dogs and starts to raise it. The game content recorded on the recording medium 40 is displayed on the monitor 28 by the game-screen output unit 43, so that a predetermined game screen containing the character, such as the one shown in FIG. 3, is displayed. In this game, upon reaching a predetermined time $T_1$ within the period of the game, the dog wakes up without being instructed from the game player, and sleeps without being instructed when a predetermined time $T_n$ is reached. That is, a predetermined behavior pattern is automatically selected according to the lapse of the game period, and the dog behaves in response to the selected behavior pattern. When the dog wakes up, the setting of the dog's temperament is changed.

In FIG. 4, it is first determined in step ST1 whether a predetermined time (time N) has been reached. If the outcome of step ST1 is yes, a demand for "walking", "playing", "cleaning after doing the toilet", "stroking", "feeding", etc., is made from the dog, and thus, in step ST5, the game player determines from the dog's behavior and the lapse of time which demand the dog is making, and the corresponding operation or processing is suitably performed by selecting one of the commands indicated on the monitor 28. If it is found in step ST1 that the predetermined time has not been reached, the determination of step ST1 is repeatedly made until the time N has been reached. The corresponding operation or processing performed by the game player in step ST5 produces an enormous influence on how the dog will be raised.

Subsequently, in step ST10, the dog executes a predetermined behavior pattern selected from the dog behavior pattern table according to the preset temperament. It is then determined in step ST15 whether the day has passed (whether it is the time when the dog sleeps). If the result of step ST15 is yes, it is further determined in step ST20 whether a predetermined period required for raising the dog has elapsed. If the outcome of step ST20 is yes, the raising of the dog is completed. If it is found in step ST15 that the day has not passed, the process returns to step ST1, and the corresponding processing is repeatedly executed. If it is found in step ST20 that the predetermined period has not elapsed, the process also returns to step ST1, and the corresponding processing is repeatedly executed.

The present invention is not restricted to the foregoing embodiment, and the following various modifications may be made. (1) In the foregoing embodiment, the dog's temperament setting is changed according to the cumulative numerical values used as indices, which are determined by the content described in the "conditions for increasing and decreasing the numerical value" column shown in FIG. 7 added to or subtracted from the basic parameters a through i. The indices for setting the temperament do not have to be numerical values. For example, predetermined signs may be provided according to the content described in the "conditions for increasing and decreasing the numerical value" column shown in FIG. 7. The signs may be then added, and the resulting value may be used for determining the dog's temperament.

(2) In the foregoing embodiment, the character raised in the game is a dog. However, the character to be raised is not limited to a dog, and may be other pets or animals other than pets. Additionally, the present invention is not restricted to character-raising games, and may be used in other types of games. In short, the present invention may be suitably used in any game in which character's behavior is autonomously changed according to various situations in a game space. According, the game can be highly entertaining.

(3) At the start of the game, a plurality of owners (owner characters) who keep the character to be raised may be provided and selected. Thus, the settings of the gender and appearance of the owner characters displayed on the game screen may be changed, and the character to be raised may be operated differently in response to the same instruction given through the controller 33. With this arrangement, the game can be made even more entertaining.

(4) The scene may be changed according to the time slot during the game period, such as morning, daytime, evening, night, etc., or the walking scene may be changed according to the seasons, i.e., spring, summer, fall, and winter. This enables the game player to feel the lapse of time within one day or seasonal changes through the game screen. The game player is thus able to enjoy almost the exact feeling of raising the actual character.

Figure 9:
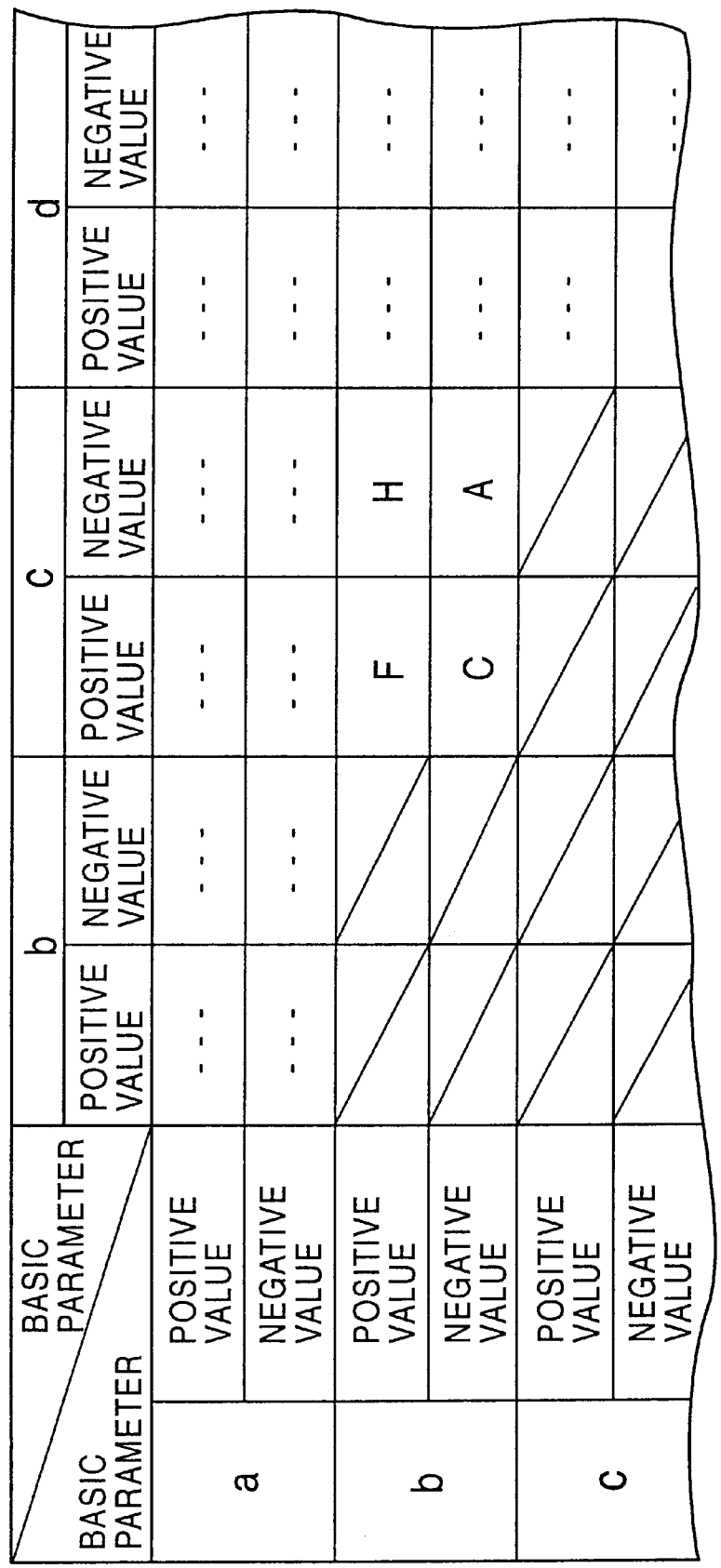
FIG. 9 is a temperament conversion table for determining the temperament based on two basic parameters.

(5) In the foregoing embodiment, the temperament is determined from the temperament conversion table shown in FIG. 9 based on the two basic parameters selected by the cumulative absolute values. However, the temperament may be selectively determined based on the two basic parameters corresponding to the greatest and the second greatest positive or negative cumulative value. Alternatively, the temperament may be selectively determined based on the basic parameter corresponding to the greatest positive or negative cumulative value.

(6) In the above-described embodiment, in determining the character's emotion, a predetermined numerical value is subtracted from each of the emotions other than the emotion read from the emotion determining table illustrated in FIG. 11A or 11B, and the total subtracted values are added to the emotion read from the emotion determining table. Then, the emotion having the greatest value is determined to be the character's current emotion. However, the character's emotions may be determined in different manners. For example, a predetermined value may be subtracted from each of the emotions other than the emotion read from the emotion determining table shown in FIG. 11A or 11B without adding the total subtracted value to the read emotion, and the emotion having the greatest value may be set to be the character's current emotion. Alternatively, a predetermined value may be added to the emotion read from the emotion determining table shown in FIG. 11A or 11B without subtracting the added value from each of the other emotions, and the emotion having the greatest value may be set to be the current emotion. Alternatively, the emotion read from the emotion determining table may be determined to be the current emotion as it is.

What is claimed is:

1. A video game machine that allows a character to appear in a game space displayed on a display screen of display means, comprising:

temperament setting means for providing a variable temperament change of the character based on an action performed on the character by a game player and a temperament of the character when the action is performed;

behavior-pattern storage means for storing a plurality of behavior patterns which are set in accordance with the temperament of the character;

behavior selection means for selecting one of the behavior patterns in accordance with the temperament of the character; and behavior control means for causing the character to behave according to the behavior pattern selected by said behavior selection means.

2. A video game machine according to claim 1, wherein the game space comprises a plurality of game scenes, and the plurality of behavior patterns are set for a specific game scene.

3. A video game machine according to claim 1, wherein said behavior-pattern storage means stores not only the behavior patterns which are set in accordance with the temperament of the character, but also behavior patterns which are set according to a lapse of a game period, and said behavior selection means selects not only one of the behavior patterns in accordance with the temperament of the character, but also one of the behavior patterns according to the lapse of the game period.

4. A video game machine according to claim 3, further comprising demand-action determining means for determining at predetermined intervals whether a demand action has been performed from the character to the game player, wherein the behavior patterns which are set according to the lapse of the game period include the demand actions.

5. A video game machine according to claim 4, wherein the demand action is performed according to the temperament of the character.

6. A video game machine according to claim 1, further comprising at least one operation means for executing an instruction concerning the action.

7. A video game machine according to claim 6, wherein a plurality of icons for specifying an instruction content given by said operation means are indicated on the display screen of said display means, and said operation means selects one of the plurality of icons.

8. A video game machine according to claim 1, wherein said temperament setting means updates the setting of the temperament at predetermined intervals.

9. A video game machine according to claim 1, wherein the temperament of the character is determined in accordance with predetermined parameters.

10. A video game machine according to claim 9, wherein said temperament setting means comprises numerical-value providing means for providing a numerical value used as an index for the predetermined parameter according to an instruction content concerning the action and the temperament of the character when the instruction is executed, addition means for adding the provided numerical value for each of the predetermined parameters, and temperament selection means for selectively determining the temperament according to an addition result obtained by said addition means.

11. A video game machine according to claim 1, further comprising emotion setting means for setting one of a plurality of emotions for the character in accordance with an instruction content concerning the action, wherein said behavior selection means selects one of the behavior patterns from said behavior-pattern storage means in accordance with the temperament and emotion of the character, and said behavior control means causes the character to behave according to the behavior pattern selected by said behavior selection means.

12. A video game machine according to claim 11, wherein said emotion setting means sets the emotion in accordance with the temperament of the character when the instruction concerning the action is executed.

13. A video game machine according to claim 11, further comprising emotion storage means for storing a numerical value used as an index for each of the emotions, wherein said emotion setting means comprises subtraction means for subtracting a predetermined value from the numerical values currently stored in said emotion storage means corresponding to the emotions other than the emotion determined by said emotion setting means according to the instruction content concerning the action and the temperament of the character when the instruction is executed, addition means for adding the subtracted value to the numerical value currently stored in said emotion storage means corresponding to the emotion determined by said emotion setting means, and emotion selection means for selectively determining the emotion having the greatest index value from said emotion storage means.

14. A video game machine according to claim 1, further comprising character storage means for storing a plurality of characters, and character selection means for selecting one of the plurality of characters.

15. A video game machine that allows a character to appear in a game space displayed on a display screen of display means, comprising:

temperament setting means for providing a variable temperament change of the character based on an action performed on the character by a game player and a temperament of the character when the action is performed;

behavior-pattern storage means for storing a plurality of behavior patterns which are set in accordance with the temperament of the character;

behavior selection means for selecting one of the behavior patterns in accordance with various situations in the game space; and behavior control means for causing the character to behave according to th behavior pattern selected by said behavior selection means.

16. A method for controlling a character behavior in a video game that allows a character to appear in a game space, said method comprising:

a game-screen output step of outputting a game screen including the character to a display screen of display means;

a temperament setting step of providing a variable temperament change of the character based on an action performed on the character by a game player and a temperament of the character when the action is performed;

a behavior-pattern selection step of selecting, according to the temperament of the character, one of a plurality of behavior patterns which are set in accordance with the temperament of the character; and a character-behavior control step of causing the character to behave according to the selected behavior pattern.

17. A computer-readable recording medium for recording a video game program that allows a character to appear in a game space, said game program comprising:

a game-screen output step of outputting a game screen including the character to a display screen of display means;

a temperament setting step of providing a variable temperament change of a character based on an action performed on the character by a game player and a temperament of the character when the action is performed;

a behavior-pattern selection step of selecting, according to the temperament of the character, one of a plurality of behavior patterns which are set in accordance with the temperament of the character; and a character-behavior control step of causing the character to behave according to the selected behavior pattern.

18. A video game machine that allows a character to appear in a game space displayed on a display screen of a display means comprising:

temperament setting means for providing a variable temperament change of the character based on an action performed on the character by a game player and a temperament of the character when the action is performed, wherein said temperament of the character is determined in accordance with predetermined parameters;

said temperament setting means including numerical-value providing means for providing a numerical value used as an index for each of the predetermined parameters in terms of instruction content concerning said action and the temperament of the character when the instruction is executed, wherein said numerical value varies when the instruction content is the same but the temperament of the character is different;

behavior-pattern storage means for storing a plurality of behavior patterns which are set in accordance with the temperament of the character;

behavior selection means for selecting one of the behavior patterns in accordance with temperament of the character; and behavior control means for causing the character to behave according to the behavior pattern selected by said behavior selection means.

19. A video game machine according to claim 18, further comprising means for adding the provided numerical value for each of the predetermined parameters and temperament selection means for selectively determining the temperament of the character in accordance with an addition result obtained by said means for adding.

20. A video game machine according to claim 19, wherein said temperament of the character is determined in accordance with the predetermined parameter with a largest absolute value of a cumulated value by said means for adding.

21. A video game machine according to claim 19, wherein said temperament of the character is determined in accordance with the predetermined parameters with a largest absolute value of a cumulated value and a second largest absolute value of a second cumulated value which is less than or equal to the largest absolute value by said means for adding.

* * * * *